United States Patent [19]
Michaud

[11] 4,155,099
[45] May 15, 1979

[54] SYNCHRONIZING ARRANGEMENT FOR A TELEVISION EQUIPMENT

[75] Inventor: Pierre Michaud, Paris, France

[73] Assignee: Thomson-CSF, Paris, France

[21] Appl. No.: 831,048

[22] Filed: Sep. 6, 1977

[30] Foreign Application Priority Data

Sep. 10, 1976 [FR] France .................................. 76 27290

[51] Int. Cl.² .............................................. H04N 5/04
[52] U.S. Cl. .................................................... 358/149
[58] Field of Search .......................................... 358/149

[56] References Cited
U.S. PATENT DOCUMENTS

3,790,710  2/1974  Gaucheron .......................... 358/149

*Primary Examiner*—Richard Murray
*Attorney, Agent, or Firm*—Cushman, Darby & Cushman

[57] ABSTRACT

The phase of local pulses at a line frequency F, produced in the control unit of a camera is synchronized both with the phase of reference pulses transmitted to the control unit from the camera and with that of incoming pulses received by the control unit from the exterior: in the control unit an oscillator of frequency NF (where N is large) synchronized with the incoming pulses sends, through an AND-gate, pulses to a first N-times divider formed of a counter; the AND-gate is controlled by a comparator circuit comparing the phase of the local pulses and the received reference pulses, the latter being formed of pulses which, in the camera, are in phase with the control pulses coming from the oscillator through a second N-times divider permanently supplied by the oscillator.

4 Claims, 1 Drawing Figure

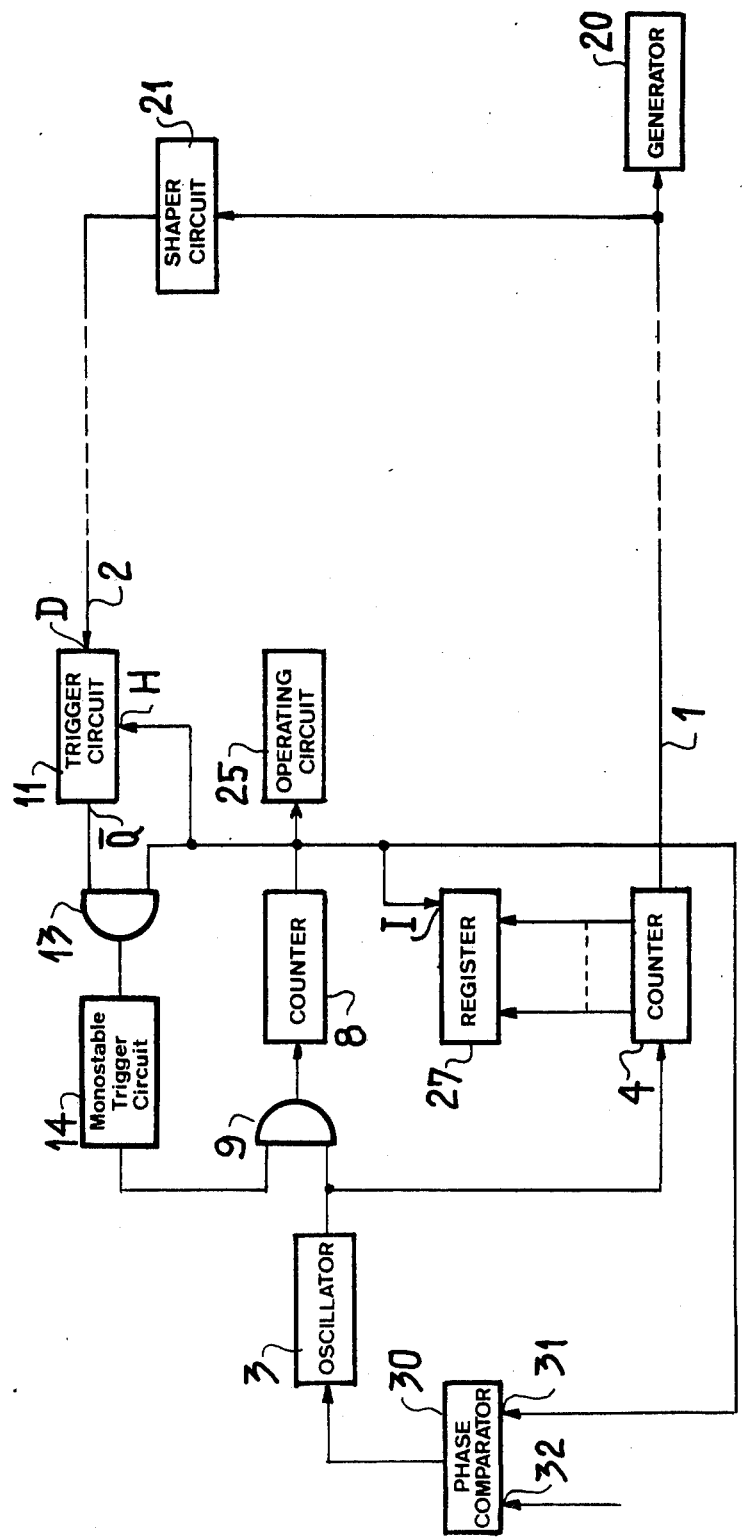

SYNCHRONIZING ARRANGEMENT FOR A TELEVISION EQUIPMENT

The present invention relates to an improvement in the phase synchronising arrangement used to synchronise the line frequency pulses (referred to hereinafter as local pulses) generated in the control unit of a television camera in order to deliver line frequency signals for insertion into the video signal received by the camera, with the line frequency pulses (hereinafter referred to as reference pulses) received from the camera, said arrangement comprising a feedback loop which, within the control unit, includes a circuit comparing the phase of the local pulses with that of the reference pulses.

Those skilled in the art will be aware that in television camera equipment used for example in outside broadcasting, the camera, carried by the operator, and the camera control unit, are linked by a cable whose length varies. This length may vary from a short value to as much as 1500 meters for example.

Self-evidently, it is essential that the line frequency signals produced in the control unit from the local pulses, should be in phase with the video signal received from the camera.

Obviously, the production of the local pulses can be controlled by reference pulses received from the camera and generated by a camera-incorporated oscillator, or again these themselves can be used as local pulses. However, this approach comes up against the problem that the local pulses must generally have a given phase in relation to line frequency signals coming from outside (from the television studio for which the outside broadcast is intended, in the case of outside broadcasts) and transmitted, generally by radio to the control unit. These latter signals will be referred to hereinafter as "incoming pulses".

It is well known to achieve the desired result by generating in the control unit local pulses having the desired phase in relation to the incoming pulses, producing in the camera line frequency signals which are used there (sweep signals and pre-blanking signals), the generators for these signals being controlled by a voltage-controlled camera oscillator, and including in the signal transmitted by the camera to the control unit, reference pulses whose phase is linked with that of the camera oscillator; in the control unit, a phase comparator receives these pulses and the local pulses, and its output signal is transmitted to the camera where it is applied to the control input of the oscillator. In this way, the local pulses are controlled in accordance with the incoming pulses and the camera oscillator in accordance with the local pulses. This arrangement has the drawback that it requires a highly stable oscillator within the camera itself if it is not possible to permanently transmit the control voltage, something which is often the case when a multiplexed link is involved.

The object of the present invention is a synchronising arrangement which has the following advantages over the known device:

A digital circuit which offers the security guarantees inherent in such circuit;

better adaptation to two-way multiplexed transmission between the control unit and the camera, in view of the fact that the signals transmitted for the purposes of this synchronising function occupy only a small part of the time;

the possibility even of open-loop operation for a given cable length, once the correct phase has been established;

the possibility, at the expense of only few additional elements, of obtaining constant measurement of the cable length, thus making it possible to adjust the camera supply voltage as a function of the cable length and thus avoid wasting energy.

In accordance with the invention, there is provided a synchronising arrangement for a television equipment comprising a camera and a control unit for said camera, said arrangement comprising: an oscillator, having an output, for producing pulses at a frequency equal to a multiple NF of the line frequency F; a phase comparator circuit having first and second inputs and an output; a switch having a signal input connected to said oscillator output, a control input connected to said output of said phase comparator circuit and an output; a first modulo-N counter having an input connected to the output of said switch and an output, for delivering in said control unit line frequency pulses, referred to as local pulses, said output of said first counter being connected to said first input of said phase comparator circuit; a second modulo-N counter, having an input connected to the output of said oscillator, for delivering further pulses at the line frequency F; transmitting means for delivering to said camera said further pulses, means for deriving from said further pulses received at said camera line frequency pulses, hereinafter referred to as reference pulses, the phase of which is a function of the phase of said further pulses; and means for transmitting said reference pulses to said second input of said phase comparator circuit.

The invention will be better understood and other of its features rendered apparent from a consideration of the ensuing description and the single related figure which is the diagram of a synchronising arrangement in accordance with the invention.

In the FIGURE, it has been assumed that the transmission of the signals concerned with the synchronising function here dealt with, between the camera and the control unit, is performed using two lines 1 and 2 respectively transmitting in a direction from control unit to camera and in the reverse direction. In modern camera equipment, these transmissions are preferably frequency multiplexed and time-division multiplexed for a given frequency channel, so that all that is required is a single coaxial line. However, since this is outside the scope of the present invention, it has been assumed, in order to simplify explanation, that the transmissions required by the synchronising arrangement are conducted in the direction from control unit to camera through a line 1 and in the direction from camera to control unit through a line 2.

In the FIGURE, 3 represents an oscillator delivering a squarewave signal and located in the control unit of a camera, the oscillator operating at $N=320$ times the line frequency. For a line period of 64 microseconds, the periodicity $\tau$ of the oscillator is therefore 0.2 microseconds. This oscillator supplies a modulo-N binary counter 4 changing to the 0 state after having counted N pulses, and then delivering an output pulse so that it acts as an N times divider. This counter 4 therefore supplies pulses at line frequency, which will be referred to hereinafter as control pulses and which are transmitted by the line 1 to the camera where they are applied to a generator 20 delivering the line frequency signals employed in the camera, as well as to a shaper circuit 21 producing in respect of each of them a reference pulse having a length L. This length L must be greater than the periodicity $\tau$ of the oscillator 3 and is made the shorter the higher the desired precision; it will be assumed for example to be equal to 0.3 microseconds = $3\tau/2$. The reference pulses are transmitted by the line 2 to the control unit.

The other elements of the camera have been omitted from illustration.

In the control unit, the local pulses used in an operating circuit 25 for processing the video signal received from the camera, are obtained by means of the oscillator 3 and an N-times divider formed of a second counter 8, identical to the first but supplied from the oscillator 3 through a switch formed of an AND-gate 9. It will straightaway be apparent that by using this gate to inhibit the transmission of a number m of pulses from the oscillator 3 to the counter 8, it is possible to delay the local pulses supplied by the counter 8 in relation to the control pulses applied to the line 1 (and consequently in relation to the reference pulses) by any time which is a multiple of $\tau = T/N$ and shorter than T, T being the line periodicity. A delay equal to or greater than T would be of no interest.

To this end, the local pulses and the reference pulses are applied to a phase comparator circuit designed in order to supply a signal blocking transmission of a pulse by the AND-gate 9 whenever there is non-coincidence between the leading edge of a local pulse and a reference pulse.

This phase comparator circuit comprising firstly a trigger circuit 11 of D-type design, supplied at its signal input D with the reference pulses and at its clock input H with the local pulses.

Assuming that the reference pulses are positive pulses of logic level 1 separated by steps of logic level 0, and that the clock input of the trigger stage is responsive to the leading edges of the local pulses, it will be seen that the trigger circuit 11 will be in the 0 state as long as the leading edge of the local pulses does not appear during the time of the reference pulses. In order first of all to obtain a signal for each local pulse not thus synchronised with a reference pulse, the output Q of the trigger circuit 11 furnishing the signal 1 when the trigger circuit is in the 0 state, is connected to the first input of an AND-gate 13 whose second input is supplies with the local pulses.

The phase comparator circuit, finally, comprises a monostable trigger circuit 14 triggered by the leading edges of the output pulses coming from the gate 13 and delivering a blocking pulse each time it is thus triggered.

The length B of this blocking pulse is determined taking into account that the oscillator 3 of peridoicity $\tau$ furnishes pulses of length $\tau/2$, and that the leading edge of the blocking signal is in phase, neglecting a slight delay R, with a pulse from the oscillator 3 and that the gate 9 must block the whole of an output pulse from the oscillator 3 in order to prevent the counter 8 from being actuated. This imposes upon B a theoretical bottom limit of $5\tau/2 - R$ and a theoretical top limit of $3\tau/2 - R$.

Advantageously, B will be given a length of around $2\tau$.

For each leading edge of a local pulse which does not coincide in time with a reference pulse, the delay introduced by the counter will therefore increase by $\tau$ until the phase comparator circuit 11, 13, 14 ceases to furnish a blocking signal.

The leading edge of the local pulses is therefore either in phase with the leading edge of the reference pulses or lags it by a time less than $L = 3\tau/2$, this being a result which can always be achieved since the interval $\tau$ of the delay introduced by the counter 8, is less than L.

It will be noted that if the length of the cable should be reduced in relation to its previous length so that the phase of the local pulses would in normal circumstances lag that of the reference pulses by m $\tau$, to within $\tau$, the phase lead required in the local pulses may be obtained by inhibiting (N-m) input pulses to the counter 8.

In all cases, for stable conditions to be obtained (AND-gate 9 conducting), when the counter 8 displays 0 the counter 4 will display a number m corresponding to the delay N$\tau$ imparted to the local pulses in relation to the control pulses in order to compensate for twice the electrical path between the camera and the control unit; m is therefore a measure of the length of the cable and this measure is unambiguous if twice the duration of the electrical path is less than N$\tau$ (which latter figure would correspond to a length of around 20 kilometers.)

However, the counter 8 acquires the 0 state when it has counted N pulses and it is then that it delivers a local pulse. This local pulse is applied to the record input I of a register 27.

This register supplies a display device (not shown) displaying the count it is registering.

The number of stages in the register 27 can be reduced by not recording the bits of highest factor, bearing in mind the maximum length of the cable, or the bits of lowest weighting factor, bearing in mind the desired precision.

It has been said that the local pulses must generally also be synchronised in phase with the incoming line frequency pulses.

To satisfy this requirement, the oscillator 3 is a voltage-controlled oscillator, its control input being connected to the output of a pulse phase comparator 30 furnishing a direct error signal and supplied respectively at its inputs 32 and 31 with the incoming pulses and the local pulses.

As mentioned, in order to avoid having to discuss details which are outside the scope of the present invention, it has been assumed that two separate lines are used for the transmission operations pertaining to the synchronising arrangement.

In the case of a multiline cable between the camera and the control unit, the reference pulses will advantageously be inserted during the blanking intervals in the video signal delivered by the camera. If a single coaxial line is used, then control pulses will be time-division multiplexed with other service signals transmitted on a frequency channel of the multiplex signal.

The pulses supplied to the camera could have a frequency of which is a multiple of F, this by means of a q-times divider incorporated into the camera. This could be done if the frequency qF could be used in the camera for digital transmission of service signals.

On the other hand, the reference pulses need not be transmitted or used for each line period, provided their phase is correct. For example, it could be arranged that they are used only during the field blanking intervals, this by enabling the gate 13 only during these intervals, this gate then having a third input.

Finally, it should be pointed out that all the phase-synchronising operations referred to need not necessarily involve the attainment of cophasal conditions, but could be concerned with the acquirement of predetermined phase-shifts in one direction or the other, which result could always be obtained using a fixed delay device arranged in one or the other of the input channels of a phase comparator circuit.

Of course, the invention is not limited to the embodiment described and shown which was given solely by way of example.

What is claimed, is:

1. A synchronising arrangement for a television equipment comprising a camera and a control unit for said camera, said arrangement comprising: an oscillator, having an output, for producing pulses at a frequency equal to a multiple NF of the line frequency F; a phase comparator circuit having first and second inputs and an output; a switch having a signal input connected to said oscillator output, a control input connected to said output of said phase comparator circuit and an output; a first modulo-N counter having an input connected to the output of said switch and an output, for delivering in said control unit local line frequency pulses, said output of said first counter being connected to said first input of said phase comparator circuit; a second modulo-N counter, having an input connected to the output of said oscillator, for delivering further pulses at the line frequency F; transmitting means for delivering to said camera said further pulses, means for deriving from said further pulses received at said camera line frequency reference pulses, the phase of which is a function of the phase of said further pulses; and means for transmitting said reference pulses to said second input of said phase comparator circuit.

2. A synchronising arrangement as claimed in claim 1, comprising a phase comparator device having a first input for receiving line frequency pulses coming to the control unit from outside, a second input for receiving said local pulses and an output, and wherein said oscillator comprises a control input coupled to the output of said phase comparator device.

3. A synchronising arrangement as claimed in claim 1, wherein said reference pulses have a duration which is longer than the periodicity of said oscillator and wherein said phase comparator circuit comprises: a D-type trigger circuit with an inverted output, a signal input and a clock input, said two inputs of said trigger circuit forming said two inputs of said phase comparator circuit; an AND-gate having a first input connected to the inverted output of said trigger circuit and a second input for receiving the same pulses as are received by the clock input of said D-type trigger circuit; and a monostable trigger circuit having an input connected to the output of said AND-gate and an output which is the output of the phase comparator circuit, said switch being for preventing the transmission to said first counter of the pulses from said oscillator for the duration of the quasi-stable state of said monostable trigger circuit, said duration being determined for causing said switch to prevent the transmission to said first counter of one pulse from said oscillator and one only in the course of said duration.

4. A synchronising arrangement as claimed in claim 1, further comprising a device for recording at least part of the bits of the count of said second counter, when said first counter passes through the count 0.

* * * * *